UNITED STATES PATENT OFFICE.

THEODOR BECKER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

SOLVENT FOR ACETYL CELLULOSE.

988,965. Specification of Letters Patent. Patented Apr. 11, 1911.

No Drawing. Application filed March 15, 1910. Serial No. 549,473.

*To all whom it may concern:*

Be it known that I, THEODOR BECKER, doctor of philosophy, chemist, citizen of the German Empire, residing at Elberfeld, Germany, have invented new and useful Improvements in New Solvents for Acetyl Cellulose, of which the following is a specification.

In the treatment of cellulose ester and the production of solutions for the manufacture of lacquers or varnishes, photographic films and other flexible and plastic compounds, I have found that dichlorethylene has no or only very low dissolving power for the cellulose esters which are suitable for the manufacture of lacquers or varnishes, photographic films and other flexible and plastic compounds but that dichlorethylene in conjunction with alcohol, with or without the addition of other solvents, such as acetone, chloroform, etc., furnishes solutions which are useful for all the purposes defined above.

In order to carry out my invention practically, I proceed as follows, the parts being by weight:—

Example 1: 200 parts of cellulose ester (produced according to the directions of French Patent No. 371447) are mixed with 650 parts of dichlorethylene and 150 parts of alcohol. The solution is allowed to settle and after filtration is ready for use. When poured on plates the solvents evaporate and flexible films remain behind.

Example 2: 120 parts of cellulose ester (produced according to the directions of German Patent No. 159524) are mixed with 730 parts of dichlorethylene and 150 parts of alcohol and slightly heated. The solution is employed as described above.

Example 3: 200 parts of cellulose ester (produced according to the directions of French Patent No. 371447) are thoroughly moistened with a mixture of 150 parts of ethylic alcohol and 400 parts of dichlorethylene and 250 parts of acetone. After allowing the mixture to stand for several hours it may be kneaded and pressed into forms, if necessary while warming.

I claim:—

1. The process for the manufacture of a solution of cellulose esters consisting in treating the ester with a mixture of alcohol and dichlorethylene.

2. The process for the manufacture of a solution of acetylcellulose consisting in treating the ester with a mixture of alcohol and dichlorethylene.

3. The process for the manufacture of a solution of cellulose esters consisting in treating the ester with a mixture of alcohol and dichlorethylene in the presence of organic solvents such as have been hitherto employed for dissolving cellulose esters.

4. The process for the manufacture of a solution of acetylcellulose consisting in treating the ester with a mixture of alcohol and dichlorethylene in the presence of organic solvents such as have been hitherto employed for dissolving acetylcellulose.

5. As a new composition of matter a solution of cellulose esters comprising dichlorethylene and alcohol.

6. As a new composition of matter a solution of acetylcellulose comprising dichlorethylene and alcohol.

7. As a new composition of matter a solution of cellulose esters comprising dichlorethylene, alcohol and organic solvents such as have been hitherto employed for dissolving cellulose esters.

8. As a new composition of matter a solution of acetylcellulose comprising dichlorethylene, alcohol and organic solvents such as have been hitherto employed for dissolving acetylcellulose.

In testimony whereof I have hereunto set my hand in the presence of two subscribing witnesses.

THEODOR BECKER. [L. S.]

Witnesses:
 OTTO KÖNIG,
 CHAS. J. WRIGHT.